US010843176B2

(12) United States Patent
Osman et al.

(10) Patent No.: US 10,843,176 B2
(45) Date of Patent: Nov. 24, 2020

(54) HIGHLY ACTIVE QUATERNARY METALLIC MATERIALS USING SHORT-CHAIN ALKYL QUATERNARY AMMONIUM COMPOUNDS

(71) Applicant: UOP LLC, Des Plaines, IL (US)

(72) Inventors: Zara Osman, Glenview, IL (US); Wei Pan, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 49 days.

(21) Appl. No.: 16/206,837

(22) Filed: Nov. 30, 2018

(65) Prior Publication Data

US 2019/0184381 A1 Jun. 20, 2019

Related U.S. Application Data

(60) Provisional application No. 62/608,391, filed on Dec. 20, 2017.

(51) Int. Cl.
| | |
|---|---|
| *B01J 27/051* | (2006.01) |
| *C10G 45/08* | (2006.01) |
| *C10G 45/50* | (2006.01) |
| *C10G 45/60* | (2006.01) |
| *B01J 37/00* | (2006.01) |
| *B01J 37/04* | (2006.01) |
| *B01J 37/20* | (2006.01) |
| *C10G 47/04* | (2006.01) |

(52) U.S. Cl.
CPC ......... *B01J 27/051* (2013.01); *B01J 37/0009* (2013.01); *B01J 37/04* (2013.01); *B01J 37/20* (2013.01); *C10G 45/08* (2013.01); *C10G 45/50* (2013.01); *C10G 45/60* (2013.01); *C10G 47/04* (2013.01); *C10G 2300/70* (2013.01)

(58) Field of Classification Search
CPC ...... B01J 27/051; B01J 37/0009; B01J 37/04; B01J 37/20; B01J 23/002; B01J 37/051; B01J 37/37; B01J 2523/67; B01J 2523/68; B01J 2523/69; B01J 2523/842; B01J 2523/845; B01J 2523/847; C01G 45/02; C01G 49/0018; C01G 51/006; C01G 53/04; C10G 1/02; C10G 45/50; C10G 45/60; C10G 47/04; C10G 2300/70
USPC .......................... 502/200, 219–231, 305–355
See application file for complete search history.

(56) References Cited

U.S. PATENT DOCUMENTS

| | | | |
|---|---|---|---|
| 3,637,627 A * | 1/1972 | Short ............... | C08F 10/00 526/97 |
| 4,820,677 A | 4/1989 | Jacobson et al. | |
| 4,904,634 A | 2/1990 | Wieserman et al. | |
| 5,278,121 A | 1/1994 | Singhal et al. | |
| 6,156,695 A | 12/2000 | Soled et al. | |
| 6,162,350 A | 12/2000 | Soled et al. | |
| 6,197,273 B1 | 3/2001 | Nagano et al. | |
| 6,280,610 B1 | 8/2001 | Uragami et al. | |
| 6,299,760 B1 | 10/2001 | Soled et al. | |
| 6,534,437 B2 | 3/2003 | Eijsbouts et al. | |
| 6,582,590 B1 | 6/2003 | Riley et al. | |
| 6,620,313 B1 | 9/2003 | Demmin et al. | |
| 6,635,599 B1 | 10/2003 | Eijsbouts et al. | |
| 6,652,738 B2 | 11/2003 | Eijsbouts et al. | |
| 6,712,955 B1 | 3/2004 | Hou et al. | |
| 6,740,620 B2 * | 5/2004 | Bogan, Jr. ............. | B01J 23/002 502/300 |
| 6,783,663 B1 | 8/2004 | Riley et al. | |
| 6,863,803 B1 | 3/2005 | Riley et al. | |
| 6,929,738 B1 | 8/2005 | Riley et al. | |
| 7,229,548 B2 | 6/2007 | Riley et al. | |
| 7,232,515 B1 | 6/2007 | Demmin et al. | |
| 7,232,934 B2 | 6/2007 | Saleh et al. | |
| 7,288,182 B1 | 10/2007 | Soled et al. | |
| 7,304,014 B2 * | 12/2007 | Cavalcanti ............. | B01J 23/002 502/300 |
| 7,513,989 B1 | 4/2009 | Soled et al. | |
| 7,538,066 B2 | 5/2009 | Soled et al. | |
| 7,544,632 B2 | 6/2009 | Soled et al. | |
| 7,591,942 B2 | 9/2009 | Soled et al. | |
| 7,605,107 B2 | 10/2009 | Soled et al. | |
| 7,608,558 B2 | 10/2009 | Eijsbouts et al. | |
| 7,648,941 B2 | 1/2010 | Soled et al. | |
| 7,686,943 B2 | 3/2010 | Soled et al. | |
| 7,691,257 B2 | 4/2010 | Shih et al. | |

(Continued)

FOREIGN PATENT DOCUMENTS

| | | |
|---|---|---|
| CA | 2719157 A1 | 10/2009 |
| CA | 2620656 C | 3/2014 |

(Continued)

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.

An, "Preparation of unsupported and mesoporous Ni—Mo—W sulfide catalysts by low temperature solid-state reaction", Journal of China University of Petroleum (Edition of Natural Science), v 31, n 6, p. 156-160, Dec. 2007, ISSN: 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014; ISSN: 09205861; DOI: 10.1016/j.cattod.2013.06.002; Publisher: Elsevier.

(Continued)

*Primary Examiner* — Patricia L. Hailey

(57) ABSTRACT

A highly active quaternary mixed transition metal oxide material has been developed. The material may be sulfided to generate metal sulfides which are used as a catalyst in a conversion process such as hydroprocessing. The hydroprocessing may include hydrodenitrification, hydrodesulfurization, hydrodemetallation, hydrodesilication, hydrodearomatization, hydroisomerization, hydrotreating, hydrofining, and hydrocracking.

24 Claims, No Drawings

(56) References Cited

U.S. PATENT DOCUMENTS

| | | | |
|---|---|---|---|
| 7,709,412 B2 | 5/2010 | Shih et al. | |
| 7,749,937 B2 | 7/2010 | Domokos et al. | |
| 7,776,205 B2 | 8/2010 | Soled et al. | |
| 7,780,845 B2 | 8/2010 | Soled et al. | |
| 7,851,402 B2 * | 12/2010 | Cunningham | C01G 19/00 |
| | | | 252/399 |
| 7,951,746 B2 | 5/2011 | Bai et al. | |
| 8,062,508 B2 | 11/2011 | Soled et al. | |
| 8,067,331 B2 | 11/2011 | Eijsbouts-Spickova et al. | |
| 8,080,492 B2 | 12/2011 | Kuperman et al. | |
| 8,173,570 B2 | 5/2012 | Maesen et al. | |
| 8,206,575 B2 | 6/2012 | Maesen et al. | |
| 8,216,958 B2 | 7/2012 | Wu et al. | |
| 8,318,628 B2 | 11/2012 | Brun et al. | |
| 8,343,887 B2 | 1/2013 | Maesen et al. | |
| 8,377,289 B2 | 2/2013 | Li et al. | |
| 8,383,543 B2 | 2/2013 | Maesen et al. | |
| 8,586,500 B2 | 11/2013 | Kuperman et al. | |
| 8,636,967 B2 | 1/2014 | Canelon et al. | |
| 8,846,560 B2 | 9/2014 | Yang et al. | |
| 2005/0239643 A1 * | 10/2005 | Benderly | B01J 23/002 |
| | | | 502/312 |
| 2008/0280754 A1 | 11/2008 | Toledo Antonio et al. | |
| 2009/0114566 A1 | 5/2009 | Chen et al. | |
| 2012/0065056 A1 | 3/2012 | Domokos et al. | |
| 2012/0122653 A1 | 5/2012 | Maesen et al. | |
| 2012/0122659 A1 | 5/2012 | Kuperman et al. | |
| 2012/0172199 A1 | 7/2012 | Yang et al. | |
| 2013/0068662 A1 | 3/2013 | Maesen et al. | |
| 2013/0337996 A1 | 12/2013 | Eijsbouts-Spickova et al. | |
| 2014/0027350 A1 | 1/2014 | Soled et al. | |
| 2015/0292095 A1 | 10/2015 | Haber et al. | |
| 2017/0165644 A1 | 6/2017 | Miller et al. | |
| 2017/0165645 A1 | 6/2017 | Miller et al. | |
| 2017/0165646 A1 | 6/2017 | Miller et al. | |
| 2017/0165647 A1 | 6/2017 | Miller et al. | |
| 2017/0165648 A1 | 6/2017 | Miller et al. | |
| 2017/0165649 A1 | 6/2017 | Miller et al. | |
| 2017/0165650 A1 | 6/2017 | Miller et al. | |
| 2017/0165651 A1 | 6/2017 | Miller et al. | |
| 2017/0165652 A1 | 6/2017 | Miller et al. | |
| 2017/0165656 A1 | 6/2017 | Miller et al. | |
| 2017/0166605 A1 | 6/2017 | Miller et al. | |
| 2017/0218528 A1 | 8/2017 | Zhang et al. | |
| 2018/0169633 A1 | 6/2018 | Millet et al. | |
| 2019/0060873 A1 | 2/2019 | Millet et al. | |
| 2019/0060882 A1 | 2/2019 | Miller et al. | |

FOREIGN PATENT DOCUMENTS

| | | | | |
|---|---|---|---|---|
| CN | 10 1306374 | * | 11/2008 | B01J 23/888 |
| CN | 102049265 A | | 5/2011 | |
| CN | 10 6179388 | * | 12/2016 | B01J 23/888 |
| EP | 2103347 A1 | | 9/2009 | |
| RU | 2098181 C1 | | 12/1997 | |
| WO | 200042126 A1 | | 7/2000 | |
| WO | 2009061295 A1 | | 5/2009 | |
| WO | 2014033653 A2 | | 3/2014 | |
| WO | 2019/126176 | * | 6/2019 | B01J 23/00 |

OTHER PUBLICATIONS

Escobar, "Effect of ethylene glycol addition on the properties of P-doped NiMo/Al2O3 HDS catalysts: Part I. Materials preparation and characterization", Applied Catalysis B: Environmental, v 88, n 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study of Mo (or W)-Co, Mo (or W)-Ni, and Mo (or W)-Ca Sulfided Phases", J. Catal., v 102, n 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chem. 1996, 35, 4191-4197.

Nava, "Effect of phosphorus addition on unsupported Ni—Mo—W sulfide catalysts prepared by the in situ activation of nickel/tetramethylammonium thiomolybdotungstate", Applied Catalysis A: General, v 303, n 2, p. 177-184, Apr. 28, 2006; ISSN: 0926860X; DOI: 10.1016/j.apcata.2005.12.025; Publisher: Elsevier.

Nikulshin, "Influence of nature of precursors of aluminum nickel molybdenum catalysts on their performance in hydrodesulfurization", Neftekhimiya, v 46, n 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 50, n 4, p. 372-374, Aug. 2005; ISSN: 05693799; Publisher: American Chemical Society.

Yin, "A novel porous ammonium nickel molybdate as the catalyst precursor towards deep hydrodesulfurization of gas oil", p. 873-878, 2013, ISSN: 0016-2361, Publisher Elsevier Science.

Yin, "Mechanism of Hydrodesulfurization of dibenzothiophenes on unsupported NiMoW catalyst", Journal of Fuel Chemistry and Technology, v 41, n 8, p. 991-997, Aug. 2013; ISSN: 18725813; DOI: 10.1016/S1872-5813(13) 60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

Clearfield, "Studies in Heavy-Metal Molybdates. I. Crystal Structure of a Basic Zinc Molybdate, NaZn2OH(H20) (MoO4)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni—Co—Mo oxy-hydroxide nanoflakes grown on carbon cloth for excellent supercapacitor electrodes", Materials Letters 208 (2017) 65-68.

Hsu, "Synthesis and characterization of mesoporous Ni—Co oxy-hydroxides for pseudocapacitor application", Electrochimica Acta 94 (2013) 104-112.

Lien, "High-performance asymmetric supercapacitor consisting of Ni—Co—Cu oxy-hydroxide nanosheets and activated carbon", Electrochemistry Communications 34 (2013) 323-326.

Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.

U.S. Appl. No. 16/189,057 Crystalline Oxy-Hydroxide Transition Metal Molybdotungstate, Millet et al. filed Nov. 30, 2018.

U.S. Appl. No. 16/189,501 Mixed Transition Metal Tungstate, Millet et al. filed Nov. 13, 2018.

U.S. Appl. No. 16/206,924 Highly Active Quaternary Metallic Materials Using Short-Chain Alkyl Quaternary Ammonium Compounds, Osman et al. filed Nov. 30, 2018.

U.S. Appl. No. 16/198,613 Highly Active Trimetallic Materials Using Short-Chain Alkyl Quaternary Ammonium Compounds, Osman et al. filed Nov. 30, 2018.

U.S. Appl. No. 16/206,804 Highly Active Trimetallic Materials Using Short-Chain Alkyl Quaternary Ammonium Compounds, Osman et al. filed Nov. 21, 2018.

U.S. Appl. No. 16/206,867 Highly Active Quaternary Metallic Materials Using Short-Chain Alkyl Quaternary Ammonium Compounds, Osman et al. filed Nov. 30, 2018.

U.S. Appl. No. 16/206,898 Highly Active Multimetallic Materials Using Short-Chain Alkyl Quaternary Ammonium Compounds, Osman et al. filed Nov. 30, 2018.

* cited by examiner

US 10,843,176 B2

HIGHLY ACTIVE QUATERNARY METALLIC MATERIALS USING SHORT-CHAIN ALKYL QUATERNARY AMMONIUM COMPOUNDS

CROSS-REFERENCE TO RELATED APPLICATION

This application claims priority from U.S. Provisional Application No. 62/608,391 filed Dec. 20, 2017, the contents of which cited application are hereby incorporated by reference in its entirety.

FIELD OF THE INVENTION

This invention relates to a new catalyst or catalyst precursor. More particularly this invention relates to a novel mixed transition metal oxide and its use as a catalyst or catalyst precursor such as a hydrocarbon conversion catalyst or catalyst precursor or specifically a hydroprocessing catalyst or catalyst precursor. The hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

Currently there are two main drivers for refiners to invest in hydroprocessing technology. The first being environmental regulations imposing more stringent specifications on fuels including gasoline, diesel, and even fuel oils. For example, permitted sulfur and nitrogen levels in fuels are significantly lower than one decade ago. A second driving force is the quality of crude oils. More refineries are facing crude oils containing higher concentrations of sulfur and nitrogen compounds which are difficult to process or remove by conventional processes. Without new technology, refiners resort to increasing the severity of hydrotreating processes either by increasing the reactor temperatures or decreasing space velocity through the reactor. Increasing reactor temperature has the drawback of shortening catalyst lifetime. Decreasing space velocity, through increasing reactor size or decreasing feed flow rates, has the drawback of overhauling the reactors or significantly reducing production rates. Therefore, a highly active hydroprocessing catalyst is needed. A highly active hydroprocessing catalyst helps the refiners meet the stringent fuel sulfur and nitrogen limitations without significant investment in reactors and equipment and while maintaining production rates.

In the early 2000s, unsupported, also called "bulk", hydrotreating catalysts were applied in commercial hydrotreating processes. These catalysts were claimed to have several times more activity than conventional supported NiMo or CoMo hydrotreating catalysts based on the same loading volumes. However, to achieve the high activity, the unsupported hydrotreating catalysts often contained significantly more metal content than the conventional supported hydrotreating catalysts. Increased metal content means the cost of the catalyst is also increased. Thus, there is a need in the industry for an unsupported catalyst with better intrinsic activity per mass. An unsupported catalyst with higher intrinsic activity per mass will require less metal loading to achieve the same activity as the unsupported catalyst with less intrinsic activity at the same loading volumes.

U.S. Pat. No. 6,156,695 described a Ni—Mo—W mixed metal oxide material. The XRD pattern of this material was shown to be largely amorphous with only two crystalline peaks, the first at d=2.53 Angstroms and the second at d=1.70 Angstroms. U.S. Pat. No. 6,534,437 described a process for preparing a catalyst comprising bulk catalyst particles having at least one Group VIII non-noble metal and at least two Group VIB metals. The metal components were stated to be at least partly in the solid state during the material synthesis reaction with solubility of less than 0.05 mol/100 ml water at 18° C. U.S. Pat. No. 7,544,632 showed a bulk multi-metallic catalyst composition containing quaternary ammonium, $[CH_3(CH_2)_dN(CH_3)_3]$, where d is an integer from about 10 to about 40. U.S. Pat. No. 7,686,943 described a bulk metal catalyst comprising metal oxidic particles containing niobium as a Group V metal, a single Group VIB metal, and a single Group VIII metal. U.S. Pat. No. 7,776,205 described a bulk metal catalyst comprising a single Group VIB metal, a Group VB metal, and a Group VIII metal.

U.S. Pat. No. 8,173,570 showed co-precipitation to form at least a metal compound in solution selected from Group VIII, at least two Group VIB metal compounds in solution, and at least one organic oxygen containing chelating ligand in solution. The organic oxygen containing ligand has an LD50 rate larger than 700 mg/kg. U.S. Pat. No. 7,803,735 showed forming an unsupported catalyst precursor by co-precipitating at least one of a Group VIB metal compound, at least a metal compound selected from Group VIII, Group IIB, Group IIA, Group IVA, and combinations thereof, and at least one of an organic oxygen-containing ligand.

CN 101306374 described a catalyst of at least one Group VIII metal, at least two Group VIB metals and an organic additive. The organic additive is selected from organic ammonium compounds with the formula of $C_nH_{2n+1}N(Me)_3X$ or $(C_nH_{2n+1})_4NX$ where n=2-20 and X denotes Cl, Br, or OH. The XRD provided shows peaks at d=11.30+/−1.5 Angstroms, d=4.15+/−0.5 Angstroms, d=2.60+/−0.5 Angstroms, and d=1.53+/−0.5 Angstroms.

Unsupported NiZnMoW materials have been discussed in Applied Catalysis A: General 474 (2014) page 60-77. The material was synthesized in two steps. The first step prepared layered NiZn hydroxides. The second step prepared the NiZnMoW material via the reaction of layered NiZn hydroxide and solution containing $MoO_4^{2-}$ and $WO_4^{2-}$.

There is a need for new materials to meet increasing demands of conversion processes including the need for catalysts with higher intrinsic activity per mass. The material disclosed herein is unique and novel in elemental composition as compared to previous materials.

SUMMARY OF THE INVENTION

A novel mixed transition metal oxide material has been produced and optionally sulfided, to yield an active catalyst such as a hydroprocessing catalyst. The novel mixed transition metal oxide material has the formula:

$$(M_I^a)_m(M_{II}^b)_n(M_{III}^c)_o(M_{IV}^d)_p C^e_q H^f_r N^g_s O^h_t X^i_u S^j_v$$

where: $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; X is a halide (IUPAC Group 17); a, b, c, d, e, f, g, h, i, and j are the valence state of $M_I$, $M_{II}$, $M_{III}$, $M_{IV}$, C, H, N, O, X, and S; m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and a, b, c, d, e, f, g, h, i, j, m, n, o, p, q, r, s, t, u, and v satisfy the equation:

$$a*m+b*n+c*o+d*p+e*q+f*r+g*s+h*t+i*u+j*v=0.$$

Another embodiment involves a method of making a mixed transition metal oxide material having the formula:

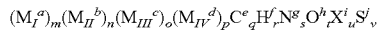

where: $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; X is a halide (IUPAC Group 17); a, b, c, d, e, f, g, h, i, and j are the valence state of $M_I$, $M_{II}$, $M_{III}$, $M_{IV}$, C, H, N, O, X, and S; m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and a, b, c, d, e, f, g, h, i, j, m, n, o, p, q, r, s, t, u, and v satisfy the equation:

$$a*m+b*n+c*o+d*p+e*q+f*r+g*s+h*t+i*u+j*v=0$$

wherein the method comprises: forming a reaction mixture containing a protic solvent, sources of $M_I$, $M_{II}$, $M_{III}$, and $M_{IV}$, a basic solution, and at least one short-chain alkyl quaternary ammonium halide compound having the formula [R1 R2 R3 R4-N]X, where R1, R2, R3 and R4 are alkyl radicals having 1 to 6 carbon atoms such as methyl, ethyl, propyl, butyl, pentyl, and hexyl, and where R1, R2, R3 and R4 can be the same or different from each other; mixing the reaction mixture; reacting the reaction mixture at a temperature from about 25° C. to about 200° C. for a period of time from about 30 minutes to 200 hours to generate the mixed transition metal oxide material; and recovering the mixed transition metal oxide material. The recovery may be by decanting, filtration or centrifugation, with or without washing of the recovered product with a protic solvent. A binder may be incorporated during the reaction or may be added to the recovered material. The binder is selected from aluminas, silicas, alumina-silicas, titanias, zirconias, natural clays, synthetic clays, and mixtures thereof. The recovered mixed transition metal oxide material may be sulfided. The pH of the reaction mixture may be adjusted using an acidic or basic solution. The reaction is conducted under atmospheric pressure or autogenous pressure. Forming the reaction mixture and the mixing may occur at the same time.

Yet another embodiment involves a conversion process comprising contacting a sulfiding agent with a material to generate metal sulfides which are contacted with a feed at conversion conditions to generate at least one product, the material comprising a mixed transition metal oxide material having the formula:

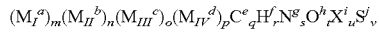

where: $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; X is a halide (IUPAC Group 17); a, b, c, d, e, f, g, h, i, and j are the valence state of $M_I$, $M_{II}$, $M_{III}$, $M_{IV}$, C, H, N, O, X, and S; m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to zero, and a, b, c, d, e, f, g, h, i, j, m, n, o, p, q, r, s, t, u, and v satisfy the equation:

$$a*m+b*n+c*o+d*p+e*q+f*r+g*s+h*t+i*u+j*v=0.$$

The conversion process may be a hydrocarbon conversion process. The conversion process may be hydroprocessing. The conversion process may be hydrodenitrification, hydrodesulfurization, hydrodemetallation, hydrodesilication, hydrodearomatization, hydroisomerization, hydrotreating, hydrofining, or hydrocracking. The mixed transition metal oxide material may be present in a mixture with at least one binder and wherein the mixture comprises up to about 80 wt % binder.

Additional features and advantages of the invention will be apparent from the description of the invention and claims provided herein.

DETAILED DESCRIPTION OF THE INVENTION

The present invention relates to a novel mixed transition metal oxide material, a process for preparing the material, and a process using the material. The material has an empirical formula:

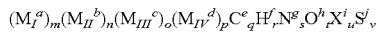

where: $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VI (IUPAC Group 6); $M_{IV}$ is a metal selected from Group VI (IUPAC Group 6) which is different from $M_{III}$; X is a halide (IUPAC Group 17); a, b, c, d, e, f, g, h, i, and j are the valence state of $M_I$, $M_{II}$, $M_{III}$, $M_{IV}$, C, H, N, O, X, and S; m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to zero, and a, b, c, d, e, f, g, h, i, j, m, n, o, p, q, r, s, t, u, and v satisfy the equation:

$$a*m+b*n+c*o+d*p+e*q+f*r+g*s+h*t+i*u+j*v=0$$

Although $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4), in one embodiment, $M_I$ may be selected from Al, Si, Zr, Mn, Cu, Zn, and any mixture thereof. Although $M_{II}$ is a metal or a mixture of metals selected from Group VIII (IUPAC Groups 8, 9, and 10), in one embodiment $M_{II}$ may be selected from Fe, Co, Ni, and any mixture thereof. Although $M_{III}$ is a metal selected from Group VIB (IUPAC Group 6) in one embodiment, $M_{III}$ is selected from Cr, Mo, and W. Although $M_{IV}$ is a metal selected from Group VIB (IUPAC Group 6) which is different from $M_{III}$, in one embodiment $M_{IV}$ is selected from Cr, Mo, and W so long as $M_{IV}$ is different from $M_{III}$.

The novel mixed transition metal oxide material can be prepared by co-precipitation by mixing, in a protic solvent, sources of the transition metals with basic solution and short chain alkyl quaternary ammonium halide compounds. The term "metal" as used herein is meant to refer to the element and not meant to necessarily indicate a metallic form.

Sources of $M_I$ include, but are not limited to, the respective halide, sulfide, acetate, nitrate, carbonate, sulfate, oxalate, thiols, hydroxide salts, and oxides of $M_I$. Specific examples of sources of $M_I$ include, but are not limited to, manganese nitrate, manganese chloride, manganese bromide, manganese sulfate, manganese carbonate, manganese sulfide, manganese hydroxide, manganese oxide, zirconium nitrate, zirconium oxychloride, zirconium bromide, zirconium sulfate, zirconium basic carbonate, zirconium hydroxide, zirconium oxide, copper nitrate, copper chloride, copper bromide, copper sulfate, copper carbonate, copper acetate, copper oxalate, copper sulfide, copper hydroxide, copper oxide, zinc nitrate, zinc chloride, iron bromide, zinc sulfate, zinc carbonate, zinc acetate, zinc oxalate, zinc sulfide, zinc hydroxide, zinc oxide, and any mixture thereof.

Sources of $M_{II}$ include, but are not limited to, the respective halide, sulfide, acetate, nitrate, carbonate, sulfate, oxalate, thiols, hydroxide salts, and oxides of $M_{II}$. Specific examples of sources of $M_{II}$ include, but are not limited to, nickel chloride, nickel bromide, nickel nitrate, nickel acetate, nickel carbonate, nickel hydroxide, cobalt chloride, cobalt bromide, cobalt nitrate, cobalt acetate, cobalt carbonate, cobalt hydroxide, cobalt sulfide, nickel chloride, cobalt oxide, nickel bromide, nickel nitrate, nickel acetate, nickel carbonate, nickel hydroxide, nickel sulfide, nickel oxide, iron acetate, iron oxalate, iron nitrate, iron chloride, iron bromide, iron sulfate, iron carbonate, iron acetate, iron oxalate, iron sulfide, iron oxide, and any mixture thereof.

Sources of $M_{III}$ include, but are not limited to, the respective oxides of $M_{III}$, sulfides of $M_{III}$, halides of $M_{III}$, molybdates, tungstates, thiolmolybdates, and thioltungstates. Specific examples of sources of $M_{III}$ include, but are not limited to, molybdenum trioxide, ammonium dimolybdate, ammonium thiomolybdate, ammonium heptamolybdate, sodium dimolybdate, sodium thiomolybdate, sodium heptamolybdate, potassium dimolybdate, potassium thiomolybdate, potassium heptamolybdate, molybdenum sulfide, tungsten trioxide, tungstic acid, tungsten oxytetrachloride, tungsten hexachloride, hydrogen tungstate, ammonium ditungstate, sodium ditungstate, ammonium metatungstate, ammonium paratungstate, sodium metatungstate, sodium paratungstate, and any mixture thereof.

Sources of $M_{IV}$ include, but are not limited to, the respective oxides of $M_{IV}$, sulfides of $M_{IV}$, halides of $M_{IV}$, molybdates, tungstates, thiolmolybdates, and thioltungstates. Specific examples of sources of $M_{IV}$ include, but are not limited to, molybdenum trioxide, ammonium dimolybdate, ammonium thiomolybdate, ammonium heptamolybdate, sodium dimolybdate, sodium thiomolybdate, sodium heptamolybdate, potassium dimolybdate, potassium thiomolybdate, potassium heptamolybdate, molybdenum sulfide, tungsten trioxide, tungstic acid, tungsten oxytetrachloride, tungsten hexachloride, hydrogen tungstate, ammonium ditungstate, sodium ditungstate, ammonium metatungstate, ammonium paratungstate, sodium metatungstate, sodium paratungstate, and any mixtures thereof.

Specific examples of basic solutions include, but are not limited to, ammonia-water (NH3.H2O), sodium hydroxide (NaOH), potassium hydroxide (KOH), tetramethylammonium hydroxide (TMAOH), tetrapropylammonium hydroxide (TPAOH), tetrabutylammonium hydroxide (TBAOH) and any mixtures thereof.

The short-chain alkyl quaternary ammonium halide compound is selected from compounds having the formula [R1 R2 R3 R4-N]X, where R1, R2, R3 and R4 are alkyl radicals having from 1 to 6 carbon atoms such as methyl, ethyl, propyl, butyl, pentyl, and hexyl, and R1, R2, R3 and R4 can be the same or different from each other. In a specific embodiment, X is selected from F, Cl, Br, and I. Specific examples of short-chain alkyl quaternary ammonium halide compounds include, but are not limited to, tetra methyl ammonium chloride, tetra methyl ammonium bromide, tetra ethyl ammonium chloride, tetra ethyl ammonium bromide, tetra propyl ammonium chloride, tetra propyl ammonium bromide, tetra butyl ammonium chloride, tetra butyl ammonium bromide, tetra pentyl ammonium chloride, tetra pentyl ammonium bromide, tri-butyl methyl ammonia chloride, tri-butyl methyl ammonium bromide, tri-propyl methyl ammonium chloride, tri-propyl methyl ammonium bromide, tri-ethyl methyl ammonium chloride, tri-ethyl methyl ammonium bromide, di-propyl di-methyl ammonium chloride, di-propyl di-methyl ammonium bromide, butyl tri-methyl ammonium chloride, butyl tri-methyl ammonium bromide, and any mixture thereof.

The material of this invention can be prepared by co-precipitation by forming a reaction mixture in a protic solvent comprising the sources of transition metals, basic solution, and at least one short-chain alkyl quaternary ammonium halide compound. Suitable protic solvents include water and alcohols such as ethanol, isopropanol, butanol, and glycol. Suitable basic solutions are discussed above. The reaction mixture may be formed by adding the components of the reaction mixture in any order and in any combination and as a variety of solutions. In one embodiment, the sources of $M_I$, $M_{II}$, $M_{III}$, and $M_{IV}$ may be in one or more solutions prior to forming the reaction mixture. In one embodiment, sources or solutions of $M_I$, $M_{II}$, $M_{III}$, and $M_{IV}$ may be mixed with protic solvent, basic solutions, a short-chain alkyl quaternary ammonium halide solution, or any of the above prior to combination to form the reaction mixture. In another embodiment, the prepared $M_I$, $M_{II}$, $M_{III}$, and $M_{IV}$ solutions can be added into protic solution and basic solution and a short-chain alkyl quaternary ammonium halide solution added to the protic solution to form the reaction mixture. In yet another embodiment, solutions of sources of $M_I$, $M_{II}$, $M_{III}$, and $M_{IV}$ in protic solvent can be added simultaneously together with the basic solution and a short-chain alkyl quaternary ammonium halide solution to form the reaction mixture.

Depending upon the metal sources selected, the pH of the reaction mixture may be adjusted to an acidic or a basic regime. The pH of the mixture may be adjusted through the addition of a base such as $NH_4OH$, quaternary ammonium hydroxides, amines, and the like, or conversely through the addition of a mineral acid such as nitric acid, hydrochloric acid, sulfuric acid, hydrofluoric acid, or an organic acid such as citric acid or malic acid, depending upon reactive sources of metals. In one embodiment, the pH does not need to be adjusted.

During or after mixing the components including, the protic solvent, the basic solution, the short-chain alkyl quaternary ammonium halide solution, and sources of $M_I$, $M_{II}$, $M_{III}$, and $M_{IV}$, the reaction mixture is reacted at temperature in the range of about 25° C. to about 200° C., or from about 60° C. to about 180° C., or from about 80° C. to about 150° C. in a sealed autoclave reactor or in a reactor open to ambient pressure. The sealed autoclave reactor or the reactor open to ambient pressure can be equipped with a stirring device to mix the reaction mixture. In another embodiment, the sealed autoclave or the reactor open to the ambient pressure does not have a stirring device and the reaction is conducted at a static state unless the temperature of the reaction mixture is higher than boiling point of the mixture, causing autonomous stirring by the boiling of the reaction mixture. In embodiment where a reactor open to ambient pressure is employed, a reflux device can be optionally attached to the reactor to avoid solvent loss when the reaction temperature is close to or above the boiling temperature of the reaction mixture.

The reaction time may range from about 0.5 to about 200 h, or 0.5 h to about 100 h, or from about 1 h to about 50 h, or from about 2 h to about 24 h. Optionally, the reaction mixture may be mixed continuously or intermittently during the reaction. In one embodiment, the reaction mixture is mixed every few hours. During reaction, the pH of the reaction mixture can vary autonomously due to the thermal decomposition of basic compounds at elevated reaction temperatures, or the pH of the reaction mixture may be adjusted manually by adding acidic or basic compounds into the reaction mixture, depending on the desired pH. The pH of the mixture may be adjusted through the addition of a base such as $NH_4OH$, quaternary ammonium hydroxides, amines, and the like, or conversely though the addition of an acid such as a mineral acid such as nitric acid, hydrochloric acid, sulfuric acid, hydrofluoric acid, or an organic acid such as citric acid or malic acid. In one embodiment, the pH does not need to be adjusted. As the reaction progresses, a slurry is formed. At the end of the reaction time, the pH of the slurry may be from about 6 to about 9, or from about 6 to about 8.5, or from about 6 to about 7.5. The slurry may need to be adjusted by adding acidic or basic compounds into the slurry in order to obtain the desired final pH. The mixed transition metal oxide material is recovered from the slurry.

In a specific embodiment, the mixed transition metal oxide material may be present in a composition along with a binder, where the binder may be, for example, silicas, aluminas, silica-aluminas, titanias, zirconias, natural clays, synthetic clays, and mixtures thereof. The selection of binder includes but is not limited to, anionic and cationic clays such as hydrotalcites, pyroaurite-sjogrenite-hydrotalcites, montmorillonite and related clays, kaolin, sepiolites, silicas, aluminas such as (pseudo) boehomite, gibbsite, flash calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk mixed transition metal oxide material, or may be incorporated during synthesis. The amount of binder may range from about 1 to about 80 wt % of the finished composition, or from about 1 to about 30 wt % of the finished composition, or from about 5 to about 26 wt % of the finished composition. The binder may be chemically bound to the mixed transition metal oxide material, or may be present in a physical mixture with the novel mixed transition metal oxide material. The mixed transition metal oxide material maybe extruded or pelletized with or without a binder.

At least a portion of the mixed transition metal oxide material, with or without a binder, or before or after inclusion of a binder, can be sulfided in situ in an application or pre-sulfided to form metal sulfides which in turn are used in an application. The sulfidation may be conducted under a variety of sulfidation conditions such as through contact of the mixed transition metal oxide material with a sulfur containing stream or feedstream as well as the use of a gaseous mixture of $H_2S/H_2$. The sulfidation of the mixed transition metal oxide material is performed at elevated temperatures, typically ranging from 50 to 600° C., or from 150 to 500° C., or from 250 to 450° C. The sulfiding step can take place at a location remote from other synthesis steps, remote from the location of the application where the mixed transition metal oxide material will be used, or remote from both the location of synthesis and remote from location of use. The materials resulting from the sulfiding step are referred to as metal sulfides which can be used as catalysts in conversion processes.

As discussed, at least a portion of the mixed transition metal oxide material of this invention can be sulfided and the resulting metal sulfides used as catalysts in conversion processes such as hydrocarbon conversion processes. Hydroprocessing is one class of hydrocarbon conversion processes in which the mixed transition metal oxide material is useful as a catalyst. Examples of specific hydroprocessing processes are well known in the art and include hydrodenitrification, hydrodesulfurization, hydrodemetallation, hydrodesilication, hydrodearomatization, hydroisomerization, hydrotreating, hydrofining, and hydrocracking. In one embodiment a conversion process comprises contacting the mixed transition metal oxide material with a sulfiding agent to generate metal sulfides which are contacted with a feed stream at conversion conditions to generate at least one product.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Contact time for the feed and the active catalyst, referred to as liquid hourly space velocities (LHSV), should be in the range of about $0.1\ h^{-1}$ to about $10\ h^{-1}$, or about $2.0\ h^{-1}$ to about $8.0\ h^{-1}$. Specific subsets of these ranges may be employed depending upon the feedstock being used. For example, when hydrotreating a typical diesel feedstock, operating conditions may include from about 3.5 MPa to about 8.6 MPa, from about 315° C. to about 410° C., from about 0.25/h to about 5/h, and from about 84 $Nm^3\ H_2/m^3$ to about 850 $Nm^3\ H_2/m^3$ feed. Other feedstocks may include gasoline, naphtha, kerosene, gas oils, distillates, and reformate.

Examples are provided below to describe the invention more completely. These examples are only by way of illustration and should not be interpreted as a limitation of the broad scope of the invention, which is set forth in the claims.

Example 1

32.4 g of ammonium heptamolybdate, 59.5 g of ammonium metatungstate, and 22.8 g of nickel nitrate were dissolved in 952 g of deionized (DI) $H_2O$ to form a solution. 63.8 g of Yttrium doped $Zr(OH)_4$ was added to the solution and form a pale green slurry. 19.3 g of TBABr was added to the resulting slurry followed by the addition of 120 ml of $NH_4OH$. The pH of the slurry was about 10.5. The slurry was heated under reflux at 100° C. for 13 hours. The pH of the final slurry was 7.1. The final slurry was then filtered hot, washed with H₂O and dried at 100° C.

Example 2

3.39 g of ammonium heptamolybdate, 6.14 g of ammonium metatungstate, and 10.68 g of nickel nitrate were dissolved in 30 g of DI H₂O to form a solution. 2.03 g of TBABr dissolved in 10 g of H₂O was added to the solution followed by the 7.2 g of NH₄OH. Then, 1.21 g of zinc nitrate dissolved in 16.55 g of DI H₂O was added. The pH of the resulting slurry was 7.75. This was heated at 100° C. for 24 hours. The final slurry was then filtered hot, washed with DI H₂O and dried at 100° C.

Example 3

1.90 g of ammonium heptamolybdate, 6.48 g of ammonium metatungstate, and 9.22 g of nickel chloride were dissolved in 30 g of DI H₂O to form a solution. To this, 2.14 g of TBABr dissolved in 10 g of DI H₂O was added followed by the addition of 7.94 g of NH₄OH. Then, 0.56 g of cobalt chloride dissolved in 19.7 g of DI H₂O was added. The pH of the resulting slurry was 7.94. This was heated at 150° C. for 16 hours. The final slurry was then filtered hot, washed with DI H₂O and dried at 100° C.

Example 4

1.90 g of ammonium heptamolybdate, 6.46 g of ammonium metatungstate, and 9.19 g of nickel chloride were dissolved in 30 g of DI H₂O to form a solution. To this, 2.13 g of TBABr dissolved in 10 g of DI H₂O was added followed by the addition of 7.93 g of NH₄OH. Then, 0.85 g of manganese chloride dissolved in 19.48 g of DI H₂O was added. The pH of the resulting slurry was 7.99. This was heated at 150° C. for 16 hours. The final slurry was then filtered hot, washed with DI H₂O and dried at 100° C.

Example 5

1.90 g of ammonium heptamolybdate, 6.46 g of ammonium metatungstate, and 9.20 g of nickel chloride were dissolved in 30 g of DI H₂O to form a solution. To this, 2.14 g of TBABr dissolved in 10 g of DI H₂O was added followed by the addition of 7.93 g of NH₄OH. Then, 0.73 g of copper chloride dissolved in 19.57 g of DI H₂O was added. The pH of the resulting slurry was 7.83. This was heated at 150° C. for 16 hours. The final slurry was then filtered hot, washed with DI H₂O and dried at 100° C.

Example 6

1.84 g of ammonium heptamolybdate, 6.26 g of ammonium metatungstate, and 10.9 g of nickel nitrate were dissolved in 30 g of DI H₂O to form a solution. To this, 2.07 g of TBABr dissolved in 10 g of DI H₂O was added followed by the addition of 7.79 g of NH₄OH. Then, 1.24 g of zinc nitrate dissolved in 17.69 g of DI H₂O was added. The pH of the resulting slurry was 7.91. This was heated at 150° C. for 15 hours. The final slurry was then filtered hot, washed with DI H₂O and dried at 100° C.

Example 7

1.39 g of ammonium heptamolybdate, 7.87 g of ammonium metatungstate, and 13.7 g of nickel nitrate were dissolved in 20 g of DI H₂O to form a solution. To this, 5.20 g of TBABr was added followed by the addition of 9 g of NH₄OH. Then, 1.44 g of manganese nitrate dissolved in 10.4 g of DI H₂O was added. The pH of the resulting slurry was 7.46. This was heated at 160° C. for 18 hours. The final slurry was then filtered hot, washed with DI H₂O and dried at 100° C.

Example 8

1.39 g of ammonium heptamolybdate, 7.88 g of ammonium metatungstate, and 12.20 g of nickel nitrate were dissolved in 20 g of DI H₂O to form a solution. To this, 5.21 g of TBABr dissolved in 5 g of DI H₂O was added followed by the addition of 9 g of NH₄OH. Then, 2.88 g of manganese nitrate dissolved in 10.44 g of DI H₂O was added. The pH of the resulting slurry was 7.70. This was heated at 160° C. for 18 hours. The final slurry was then filtered hot, washed with DI H₂O and dried at 100° C.

The recovered materials generated in Examples 1 through 8 were each analyzed by several analytical methods and determined to be within the formula and description set forth above and in the claims. Analytical methods included Inductively Coupled Plasma-Optical Emission Spectrometry (ICP-OES) as described in UOP Method 1020-17; Loss on Ignition (LOI) for Fresh, Regenerated, Used, and Spent Catalysts, Catalyst Supports, and Adsorbents as described in UOP Method 954; Standard Test Methods for Instrumental Determination of Carbon, Hydrogen, and Nitrogen in Petroleum Products and Lubricants as described in ASTM method D5291; Sulfur in Organic and Inorganic Materials by Combustion and IR Detection as described in UOP Method 864; and by X-ray fluorescence (XRF) through incorporating 11 XRF scans to capture atomic elements 11-92 (Na—U) and provide results as to bromine.

Specific Embodiments

While the following is described in conjunction with specific embodiments, it will be understood that this description is intended to illustrate and not limit the scope of the preceding description and the appended claims.

A first embodiment of the invention is a mixed transition metal oxide material having the formula $(M_I^a)_m(M_{II}^b)_n(M_{III}^c)_o(M_{IV}^d)_p C_q^e H_r^f N_s^g O_t^h X_u^i S_v^j$ where $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; X is a halide (IUPAC Group 17); a, b, c, d, e, f, g, h, i, and j are the valence state of $M_I$, $M_{II}$, $M_{III}$, $M_{IV}$, C, H, N, O, X, and S; m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and a, b, c, d, e, f, g, h, i, j, m, n, o, p, q, r, s, t, u, and v satisfy the equation a*m+b*n+c*o+d*p+e*q+f*r+g*s+h*t+i*u+j*v=0. An embodiment of the invention is one, any or all of prior embodiments in this paragraph up through the first embodiment in this paragraph wherein the mixed transition metal oxide material is present in a mixture with at least one binder and wherein the mixture comprises up to 80 wt % binder. An embodiment of the invention is one, any or all of prior embodiments in this paragraph up through the first embodiment in this paragraph wherein the binder is selected from silicas, aluminas, silica-aluminas, titanias, zirconias, natural clays, synthetic clays, and mixtures thereof. An embodiment of the invention is one, any or all of prior embodiments in this paragraph up through the first embodiment in this paragraph wherein $M_I$ is Si, Zr, Mn, Cu, Zn, or any mixture thereof. An embodiment of the invention is one, any or all of prior embodiments in this paragraph up through the first embodiment in this paragraph wherein $M_{II}$ is Fe, Co, Ni, or any mixture thereof. An embodiment of the invention is one, any or all of prior embodiments in this paragraph up through the first embodiment in this paragraph wherein $M_{III}$ is Cr, Mo, or W. An embodiment of the invention is one, any or all of prior embodiments in this paragraph up through the first embodiment in this paragraph wherein $M_{IV}$ is Cr, Mo, or W and is different from $M_{III}$. An embodiment of the invention is one, any or all of prior embodiments in this paragraph up through the first embodiment in this paragraph wherein the novel mixed transition metal oxide material is sulfided.

A second embodiment of the invention is a method of making a mixed transition metal oxide material having the formula $(M_I^a)_m(M_{II}^b)_n(M_{III}^c)_o(M_{IV}^d)_p C_q^e H_r^f N_s^g O_t^h X_u^i S_v^j$ where $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VI (IUPAC Group 6); $M_{IV}$ is a metal selected from Group VI (IUPAC Group 6) which is different from $M_{III}$; X is a halide (IUPAC Group 17); a, b, c, d, e, f, g, h, i, and j are the valence state of $M_I$, $M_{II}$, $M_{III}$, C, H, N, O, X, and S; m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and a, b, c, d, e, f, g, h, i, j, m, n, o, p, q, r, s, t, u, and v satisfy the equation a*m+b*n+c*o+d*p+e*q+f*r+g*s+h*t+i*u+j*v=0 the method comprising forming a reaction mixture containing a protic solvent, sources of $M_I$, $M_{II}$, $M_{III}$, and $M_{IV}$, a basic solution, and at least one short-chain alkyl quaternary ammonium halide compound having the formula [R1 R2 R3 R4-N]X, where R1, R2, R3 and R4 are alkyl radicals having 1 to 6 carbon atoms, and R1, R2, R3 and R4 can be the same or different; mixing the reaction mixture; reacting the reaction mixture at a temperature from about 25° C. to about 200° C. for a period of time from about 30 minutes to 200 hours to generate the mixed transition metal oxide material; and recovering the mixed transition metal oxide material. An embodiment of the invention is one, any or all of prior embodiments in this paragraph up through the second embodiment in this paragraph wherein the recovering is by decantation, filtration or centrifugation. An embodiment of the invention is one, any or all of prior embodiments in this paragraph up through the second embodiment in this paragraph further comprising adding a binder to the reaction mixture or to the recovered mixed transition metal oxide material. An embodiment of the invention is one, any or all of prior embodiments in this paragraph up through the second embodiment in this paragraph wherein the binder is selected from aluminas, silicas, alumina-silicas, titanias, zirconias, natural clays, synthetic clays, and mixtures thereof. An embodiment of the invention is one, any or all of prior embodiments in this paragraph up through the second embodiment in this paragraph further comprising sulfiding at least a portion of the recovered mixed transition metal oxide material. An embodiment of the invention is one, any or all of prior embodiments in this paragraph up through the second embodiment in this paragraph further comprising adjusting the pH of the reaction mixture using an acidic or a basic solution. An embodiment of the invention is one, any or all of prior embodiments in this paragraph up through the second embodiment in this paragraph wherein the reacting is conducted under atmospheric pressure or autogenous pressure. An embodiment of the invention is one, any or all of prior embodiments in this paragraph up through the second embodiment in this paragraph wherein the forming the reaction mixture and the mixing are at the same time. An embodiment of the invention is one, any or all of prior embodiments in this paragraph up through the second embodiment in this paragraph further comprising mixing during the reacting. An embodiment of the invention is one, any or all of prior embodiments in this paragraph up through the second embodiment in this paragraph further comprising intermittent mixing during the reacting. An embodiment of the invention is one, any or all of prior embodiments in this paragraph up through the second embodiment in this paragraph wherein the temperature is varied during the reacting.

A third embodiment of the invention is a process comprising contacting a material with a sulfiding agent to convert at least a portion of the material to metal sulfides and contacting the metal sulfides with a feed at conversion conditions to generate at least one product, wherein the material comprises a mixed transition metal oxide material having the formula $(M_I^a)_m(M_{II}^b)_n(M_{III}^c)_o(M_{IV}^d)_p C_q^e H_r^f N_s^g O_t^h X_u^i S_v^j$ where $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; X is a halide (IUPAC Group 17); a, b, c, d, e, f, g, h, i, and j are the valence state of $M_I$, $M_{II}$, $M_{III}$, $M_{IV}$, C, H, N, O, X, and S; m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and a, b, c, d, e, f, g, h, i, j, m, n, o, p, q, r, s, t, u, and v satisfy the equation a*m+b*n+c*o+d*p+e*q+f*r+g*s+h*t+i*u+j*v=0. An embodiment of the invention is one, any or all of prior embodiments in this paragraph up through the third embodiment in this paragraph wherein the conversion process is a hydrocarbon conversion process. An embodiment of the invention is one, any or all of prior embodiments in this paragraph up through the third embodiment in this paragraph wherein the conversion process is hydroprocessing. An embodiment of the invention is one, any or all of prior embodiments in this paragraph up through the third embodiment in this paragraph wherein the conversion process is selected from hydrodenitrification, hydrodesulfurization, hydrodemetallation, hydrodesilication, hydrodearomatization, hydroisomerization, hydrotreating, hydrofining, and hydrocracking. An embodiment of the invention is one, any or all of prior embodiments in this paragraph up through the third embodiment in this paragraph wherein the mixed transition metal oxide material is present in a mixture with at least one binder and wherein the mixture comprises up to about 80 wt % binder.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A mixed transition metal oxide material having the formula:

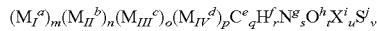

where:
$M_I$ is a metal or mixture of metals selected from Group IB (IUPAC Group 11), Group IIB (IUPAC Group 12), Group VIM (IUPAC Group 7), Group IIIA (IUPAC Group 13), Group IVA (IUPAC Group 14), and Group IVB (IUPAC Group 4);
$M_{II}$ is a metal or a mixture of metals selected from Group VIII (IUPAC Groups 8, 9, and 10);
$M_{III}$ is a metal selected from Group VIB (IUPAC Group 6);
$M_{IV}$ is a metal selected from Group VIB (IUPAC Group 6) which is different from $M_{III}$;
X is a halide (IUPAC Group 17);
a, b, c, d, e, f, g, h, i, and j are the valence state of $M_I$, $M_{II}$, $M_{III}$, $M_{IV}$, C, H, N, O, X, and S;
m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and
a, b, c, d, e, f, g, h, i, j, m, n, o, p, q, r, s, t, u, and v satisfy the equation:

$$a*m+b*n+c*o+d*p+e*q+f*r+g*s+h*t+i*u+j*v=0.$$

2. The mixed transition metal oxide material of claim 1 wherein the mixed transition metal oxide material is present in a mixture with at least one binder and wherein the mixture comprises up to 80 wt % binder.

3. The mixed transition metal oxide material of claim 2 wherein the binder is selected from silicas, aluminas, silica-aluminas, titanias, zirconias, natural clays, synthetic clays, and mixtures thereof.

4. The mixed transition metal oxide material of claim 1 wherein $M_I$ is Si, Zr, Mn, Cu, Zn, or any mixture thereof.

5. The mixed transition metal oxide material of claim 1 wherein $M_{II}$ is Fe, Co, Ni, or any mixture thereof.

6. The mixed transition metal oxide material of claim 1 wherein $M_{III}$ is Cr, Mo, or W.

7. The mixed transition metal oxide material of claim 1 wherein $M_{IV}$ is Cr, Mo, or W and is different from $M_{III}$.

8. The mixed transition metal oxide material of claim 1 wherein the novel mixed transition metal oxide material is sulfided.

9. A method of making a mixed transition metal oxide material having the formula:

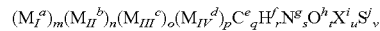

where:
$M_I$ is a metal or mixture of metals selected from Group IB (IUPAC Group 11), Group IIB (IUPAC Group 12), Group VIM (IUPAC Group 7), Group IIIA (IUPAC Group 13), Group IVA (IUPAC Group 14), and Group IVB (IUPAC Group 4);
$M_{II}$ is a metal or a mixture of metals selected from Group VIII (IUPAC Groups 8, 9, and 10);
$M_{III}$ is a metal selected from Group VI (IUPAC Group 6);
$M_{IV}$ is a metal selected from Group VI (IUPAC Group 6) which is different from $M_{III}$;
X is a halide (IUPAC Group 17);
a, b, c, d, e, f, g, h, i, and j are the valence state of $M_I$, $M_{II}$, $M_{III}$, $M_{IV}$, C, H, N, O, X, and S;
m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and
a, b, c, d, e, f, g, h, i, j, m, n, o, p, q, r, s, t, u, and v satisfy the equation:

$$a*m+b*n+c*o+d*p+e*q+f*r+g*s+h*t+i*u+j*v=0$$

the method comprising:
(a) forming a reaction mixture containing a protic solvent, sources of $M_I$, $M_{II}$, $M_{III}$, and $M_{IV}$, a basic solution, and at least one short-chain alkyl quaternary ammonium halide compound having the formula [R1 R2 R3 R4-MX, where R1, R2, R3 and R4 are alkyl radicals having 1 to 6 carbon atoms, and R1, R2, R3 and R4 can be the same or different;
(b) mixing the reaction mixture;
(c) reacting the reaction mixture at a temperature from about 25° C. to about 200° C. for a period of time from about 30 minutes to 200 hours to generate the mixed transition metal oxide material; and
(d) recovering the mixed transition metal oxide material.

10. The method of claim 9 wherein the recovering is by decantation, filtration or centrifugation.

11. The method of claim 9 further comprising adding a binder to the reaction mixture or to the recovered mixed transition metal oxide material.

12. The method of claim 11 wherein the binder is selected from aluminas, silicas, alumina-silicas, titanias, zirconias, natural clays, synthetic clays, and mixtures thereof.

13. The method of claim 9 further comprising sulfiding at least a portion of the recovered mixed transition metal oxide material.

14. The method of claim 9 further comprising adjusting the pH of the reaction mixture using an acidic or a basic solution.

15. The method of claim 9 wherein the reacting is conducted under atmospheric pressure or autogenous pressure.

16. The method of claim 9 wherein the forming the reaction mixture and the mixing are at the same time.

17. The method of claim 9 further comprising mixing during the reacting.

18. The method of claim 9 further comprising intermittent mixing during the reacting.

19. The method of claim 9 wherein the temperature is varied during the reacting.

20. A conversion process comprising contacting a material with a sulfiding agent to convert at least a portion of the material to metal sulfides and contacting the metal sulfides with a feed at conversion conditions to generate at least one product, wherein the material comprises a mixed transition metal oxide material having the formula:

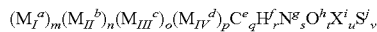

where:
- $M_I$ is a metal or mixture of metals selected from Group IB (IUPAC Group 11), Group IIB (IUPAC Group 12), Group VIM (IUPAC Group 7), Group IIIA (IUPAC Group 13), Group IVA (IUPAC Group 14), and Group IVB (IUPAC Group 4);
- $M_{II}$ is a metal or a mixture of metals selected from Group VIII (IUPAC Groups 8, 9, and 10);
- $M_{III}$ is a metal selected from Group VIB (IUPAC Group 6);
- $M_{IV}$ is a metal selected from Group VIB (IUPAC Group 6) which is different from $M_{III}$;
- X is a halide (IUPAC Group 17);
- a, b, c, d, e, f, g, h, i, and j are the valence state of $M_I$, $M_{II}$, $M_{III}$, $M_{IV}$, C, H, N, O, X, and S;
- m, n, o, p, q, r, s, t, u, and v are the mole ratio of $M_I$, $M_{II}$, $M_{III}$, $M_{IV}$, C, H, N, O, X, and S, wherein m/(m+n)>0 and m/(m+n)≤1, wherein (m+n)/(o+p) is from 1/10 to 10/1, wherein o/p>0, and 0≤p/o≤100, wherein q, r, s, t, and u are each greater than 0, wherein v is greater than or equal to 0, and
- a, b, c, d, e, f, g, h, i, j, m, n, o, p, q, r, s, t, u, and v satisfy the equation:

$$a*m+b*n+c*o+d*p+e*q+f*r+g*s+h*t+i*u+j*v=0.$$

21. The process of claim 20 wherein the conversion process is a hydrocarbon conversion process.

22. The process of claim 20 wherein the conversion process is hydroprocessing.

23. The process of claim 20 wherein the conversion process is selected from hydrodenitrification, hydrodesulfurization, hydrodemetallation, hydrodesilication, hydrodearomatization, hydroisomerization, hydrotreating, hydrofining, and hydrocracking.

24. The process of claim 20 wherein the mixed transition metal oxide material is present in a mixture with at least one binder and wherein the mixture comprises up to about 80 wt % binder.

* * * * *